United States Patent
Stadler et al.

(10) Patent No.: US 9,130,344 B2
(45) Date of Patent: Sep. 8, 2015

(54) AUTOMATED LASER TUNING

(75) Inventors: Andrew D. Stadler, San Francisco, CA (US); David Goldman, Napa, CA (US); Mark Farley, Napa, CA (US); Michael M. Mielke, Santa Rosa, CA (US)

(73) Assignee: Raydiance, Inc., Petaluma, CA (US)

( * ) Notice: Subject to any disclaimer, the term of this patent is extended or adjusted under 35 U.S.C. 154(b) by 1108 days.

(21) Appl. No.: 12/363,646

(22) Filed: Jan. 30, 2009

(65) Prior Publication Data

US 2009/0213879 A1   Aug. 27, 2009

Related U.S. Application Data

(60) Continuation-in-part of application No. 11/740,874, filed on Apr. 26, 2007, now Pat. No. 8,232,687, and a continuation-in-part of application No. 12/259,176, filed on Oct. 27, 2008, now Pat. No. 8,139,910, which (Continued)

(51) Int. Cl.
| | |
|---|---|
| *H01S 3/10* | (2006.01) |
| *H01S 3/23* | (2006.01) |
| *H01S 3/00* | (2006.01) |
| *H01S 3/13* | (2006.01) |

(52) U.S. Cl.
CPC ........... *H01S 3/10007* (2013.01); *H01S 3/2316* (2013.01); *H01S 3/0057* (2013.01); *H01S 3/0085* (2013.01); *H01S 3/1301* (2013.01)

(58) Field of Classification Search
CPC . H01S 3/2316; H01S 3/10007; H01S 3/0057; H01S 3/0085; H01S 3/1301
USPC ...................................................... 372/20, 25
See application file for complete search history.

(56) References Cited

U.S. PATENT DOCUMENTS

| | | | |
|---|---|---|---|
| 2,436,662 | A | 2/1948 | Norgaard |
| 3,459,960 | A | 8/1969 | Aaland et al. |
| 3,549,256 | A | 12/1970 | Brienza et al. |
| 3,599,019 | A | 8/1971 | Nannichi et al. |
| 3,602,836 | A | 8/1971 | Young |

(Continued)

FOREIGN PATENT DOCUMENTS

| | | |
|---|---|---|
| EP | 0214100 | 3/1987 |
| EP | 0691563 | 1/1996 |

(Continued)

OTHER PUBLICATIONS

Siegman, "Unstable Optical Resonators", Applied Optics, Feb. 1974, pp. 353-367, vol. 13, No. 2.

(Continued)

*Primary Examiner* — Yuanda Zhang
(74) *Attorney, Agent, or Firm* — Haverstock & Owens LLP

(57) ABSTRACT

In exemplary embodiments, an ultra short pulse system comprises a laser platform which includes an optical source configured to generate an optical pulse, an optical amplifier configured to amplify the optical pulse, and a compressor configured to temporally compress the amplified optical pulse. The ultra short pulse system further comprises monitor circuitry configured to monitor one or more performance aspects of the laser platform. Additionally, the ultra short pulse system may comprise logic configured to control the one or more performance aspects of the laser platform in response to at least the monitored one or more performance aspects.

33 Claims, 4 Drawing Sheets

Related U.S. Application Data is a division of application No. 11/615,883, filed on Dec. 22, 2006, now Pat. No. 7,444,049.

(60) Provisional application No. 60/796,646, filed on Apr. 26, 2006, provisional application No. 60/761,736, filed on Jan. 23, 2006, provisional application No. 60/762,284, filed on Jan. 25, 2006, provisional application No. 60/763,002, filed on Jan. 26, 2006, provisional application No. 60/762,791, filed on Jan. 26, 2006, provisional application No. 60/762,790, filed on Jan. 26, 2006.

(56) References Cited

U.S. PATENT DOCUMENTS

| | | | |
|---|---|---|---|
| 3,626,318 | A | 12/1971 | Young |
| 3,646,469 | A | 2/1972 | Buczek et al. |
| 3,654,624 | A | 4/1972 | Becker et al. |
| 3,764,641 | A | 10/1973 | Ash |
| 3,806,829 | A | 4/1974 | Duston et al. |
| 3,808,549 | A | 4/1974 | Maurer |
| 3,851,267 | A | 11/1974 | Tanner |
| 3,963,953 | A | 6/1976 | Thornton, Jr. |
| 4,061,427 | A | 12/1977 | Fletcher et al. |
| 4,194,813 | A | 3/1980 | Benjamin et al. |
| 4,289,378 | A | 9/1981 | Remy et al. |
| 4,449,215 | A | 5/1984 | Reno |
| 4,590,598 | A | 5/1986 | O'Harra, II |
| 4,718,418 | A | 1/1988 | L'Esperance, Jr. |
| 4,730,113 | A | 3/1988 | Edwards et al. |
| 4,750,809 | A | 6/1988 | Kafka et al. |
| 4,808,000 | A | 2/1989 | Pasciak |
| 4,815,079 | A | 3/1989 | Snitzer et al. |
| 4,827,125 | A | 5/1989 | Goldstein |
| 4,829,529 | A | 5/1989 | Kafka |
| 4,835,670 | A | 5/1989 | Adams et al. |
| 4,847,846 | A | 7/1989 | Sone et al. |
| 4,848,340 | A | 7/1989 | Bille et al. |
| 4,856,011 | A | 8/1989 | Shimada et al. |
| 4,878,127 | A | 10/1989 | Zollman et al. |
| 4,902,127 | A | 2/1990 | Byer et al. |
| 4,907,586 | A | 3/1990 | Bille et al. |
| 4,913,520 | A | 4/1990 | Kafka |
| 4,915,757 | A | 4/1990 | Rando |
| 4,928,316 | A | 5/1990 | Heritage et al. |
| 4,947,398 | A | 8/1990 | Yasuda et al. |
| 4,950,268 | A | 8/1990 | Rink |
| 4,972,423 | A | 11/1990 | Alfano et al. |
| 4,983,034 | A | 1/1991 | Spillman, Jr. |
| 4,994,059 | A | 2/1991 | Kosa et al. |
| 5,010,555 | A | 4/1991 | Madey et al. |
| 5,014,290 | A | 5/1991 | Moore et al. |
| 5,022,042 | A | 6/1991 | Bradley |
| 5,031,236 | A | 7/1991 | Hodgkinson et al. |
| 5,043,991 | A | 8/1991 | Bradley |
| 5,095,487 | A | 3/1992 | Meyerhofer et al. |
| 5,098,426 | A | 3/1992 | Sklar et al. |
| 5,154,707 | A | 10/1992 | Rink et al. |
| 5,159,402 | A | 10/1992 | Ortiz, Jr. |
| 5,162,643 | A | 11/1992 | Currie |
| 5,166,818 | A | 11/1992 | Chase et al. |
| 5,187,759 | A | 2/1993 | DiGiovanni et al. |
| 5,194,713 | A | 3/1993 | Egitto et al. |
| 5,204,867 | A | 4/1993 | Koschmann |
| 5,206,455 | A | 4/1993 | Williams et al. |
| 5,233,182 | A | 8/1993 | Szabo et al. |
| 5,255,117 | A | 10/1993 | Cushman |
| 5,265,107 | A | 11/1993 | Delfyett, Jr. |
| 5,301,347 | A | 4/1994 | Kensky |
| 5,302,835 | A | 4/1994 | Bendett et al. |
| 5,309,453 | A | 5/1994 | Treacy |
| 5,315,436 | A | 5/1994 | Lowenhar et al. |
| 5,355,383 | A | 10/1994 | Lockard |
| 5,400,350 | A | 3/1995 | Galvanauskas |
| 5,418,809 | A | 5/1995 | August, Jr. et al. |
| 5,428,471 | A | 6/1995 | McDermott |
| 5,430,572 | A | 7/1995 | DiGiovanni et al. |
| 5,440,573 | A | 8/1995 | Fermann |
| 5,450,427 | A | 9/1995 | Fermann et al. |
| 5,479,422 | A | 12/1995 | Fermann et al. |
| 5,489,984 | A | 2/1996 | Hariharan et al. |
| 5,493,579 | A | 2/1996 | Ressl et al. |
| 5,517,043 | A | 5/1996 | Ma et al. |
| 5,548,098 | A | 8/1996 | Sugawara et al. |
| 5,572,335 | A | 11/1996 | Stevens |
| 5,572,358 | A | 11/1996 | Gabl et al. |
| 5,585,642 | A | 12/1996 | Britton et al. |
| 5,585,652 | A | 12/1996 | Kamasz et al. |
| 5,585,913 | A | 12/1996 | Hariharan et al. |
| 5,590,142 | A | 12/1996 | Shan |
| 5,592,327 | A | 1/1997 | Gabl et al. |
| 5,617,434 | A | 4/1997 | Tamura et al. |
| 5,624,587 | A | 4/1997 | Otsuki et al. |
| 5,625,544 | A | 4/1997 | Kowshik et al. |
| 5,627,848 | A | 5/1997 | Fermann et al. |
| 5,633,750 | A | 5/1997 | Nogiwa et al. |
| 5,633,885 | A | 5/1997 | Galvanauskas et al. |
| 5,651,018 | A | 7/1997 | Mehuys et al. |
| 5,656,186 | A | 8/1997 | Mourou et al. |
| 5,663,731 | A | 9/1997 | Theodoras, II et al. |
| 5,665,942 | A | 9/1997 | Williams et al. |
| 5,670,067 | A | 9/1997 | Koide et al. |
| 5,677,769 | A | 10/1997 | Bendett |
| 5,689,361 | A | 11/1997 | Damen et al. |
| 5,689,519 | A | 11/1997 | Fermann et al. |
| 5,696,782 | A | 12/1997 | Harter et al. |
| 5,701,319 | A | 12/1997 | Fermann |
| 5,703,639 | A | 12/1997 | Farrier et al. |
| 5,710,424 | A | 1/1998 | Theodoras, II et al. |
| 5,720,894 | A | 2/1998 | Neev et al. |
| 5,726,855 | A | 3/1998 | Mourou et al. |
| 5,739,933 | A | 4/1998 | Dembeck et al. |
| 5,770,864 | A | 6/1998 | Dlugos |
| 5,771,253 | A | 6/1998 | Chang-Hasnain et al. |
| 5,778,016 | A | 7/1998 | Sucha et al. |
| 5,786,117 | A | 7/1998 | Hoshi et al. |
| 5,788,688 | A | 8/1998 | Bauer et al. |
| 5,790,574 | A | 8/1998 | Rieger et al. |
| 5,815,519 | A | 9/1998 | Aoshima et al. |
| 5,818,630 | A | 10/1998 | Fermann et al. |
| 5,847,863 | A | 12/1998 | Galvanauskas et al. |
| 5,862,287 | A | 1/1999 | Stock et al. |
| 5,862,845 | A | 1/1999 | Chin et al. |
| 5,867,304 | A | 2/1999 | Galvanauskas et al. |
| 5,875,408 | A | 2/1999 | Bendett et al. |
| 5,880,823 | A | 3/1999 | Lu |
| 5,880,877 | A | 3/1999 | Fermann et al. |
| 5,898,485 | A | 4/1999 | Nati, Jr. |
| 5,907,157 | A | 5/1999 | Yoshioka et al. |
| 5,923,686 | A | 7/1999 | Fermann et al. |
| 5,929,430 | A | 7/1999 | Yao et al. |
| 5,933,271 | A | 8/1999 | Waarts et al. |
| 5,936,716 | A | 8/1999 | Pinsukanjana et al. |
| 5,994,667 | A | 11/1999 | Merdan et al. |
| 6,014,249 | A | 1/2000 | Fermann et al. |
| 6,020,591 | A | 2/2000 | Harter et al. |
| 6,034,975 | A | 3/2000 | Harter et al. |
| 6,041,020 | A | 3/2000 | Caron et al. |
| 6,061,373 | A | 5/2000 | Brockman et al. |
| 6,075,588 | A | 6/2000 | Pinsukanjana et al. |
| 6,099,522 | A | 8/2000 | Knopp et al. |
| 6,122,097 | A | 9/2000 | Weston et al. |
| 6,134,003 | A | 10/2000 | Tearney et al. |
| 6,168,590 | B1 | 1/2001 | Neev |
| 6,172,611 | B1 | 1/2001 | Hussain et al. |
| 6,175,437 | B1 | 1/2001 | Diels et al. |
| 6,179,421 | B1 | 1/2001 | Pang |
| 6,181,463 | B1 | 1/2001 | Galvanauskas et al. |
| 6,198,568 | B1 | 3/2001 | Galvanauskas et al. |
| 6,198,766 | B1 | 3/2001 | Schuppe et al. |
| 6,208,458 | B1 | 3/2001 | Galvanauskas et al. |
| 6,228,748 | B1 | 5/2001 | Anderson et al. |
| 6,246,816 | B1 | 6/2001 | Moore et al. |

(56) References Cited

U.S. PATENT DOCUMENTS

| | | |
|---|---|---|
| 6,249,630 B1 | 6/2001 | Stock et al. |
| 6,256,328 B1 | 7/2001 | Delfyett et al. |
| 6,269,108 B1 | 7/2001 | Tabirian et al. |
| 6,271,650 B1 | 8/2001 | Massie et al. |
| 6,275,250 B1 | 8/2001 | Sanders et al. |
| 6,281,471 B1 | 8/2001 | Smart |
| 6,290,910 B1 | 9/2001 | Chalk |
| 6,303,903 B1 | 10/2001 | Liu |
| 6,314,115 B1 | 11/2001 | Delfyett et al. |
| 6,327,074 B1 | 12/2001 | Bass et al. |
| 6,327,282 B2 | 12/2001 | Hammons et al. |
| 6,330,383 B1 | 12/2001 | Cai et al. |
| 6,334,011 B1 | 12/2001 | Galvanauskas et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 | 3/2002 | Housand et al. |
| 6,366,395 B1 | 4/2002 | Drake et al. |
| 6,370,171 B1 | 4/2002 | Horn et al. |
| 6,371,469 B1 | 4/2002 | Gray |
| 6,396,317 B1 | 5/2002 | Roller et al. |
| 6,400,871 B1 | 6/2002 | Minden |
| 6,407,363 B2 | 6/2002 | Dunsky et al. |
| 6,418,154 B1 | 7/2002 | Kneip et al. |
| 6,421,169 B1 | 7/2002 | Bonnedal et al. |
| 6,425,912 B1 | 7/2002 | Knowlton |
| 6,433,760 B1 | 8/2002 | Vaissie et al. |
| 6,437,283 B1 | 8/2002 | Wiggermann et al. |
| 6,463,314 B1 | 10/2002 | Haruna |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 | 2/2003 | Vogler et al. |
| 6,529,319 B2 | 3/2003 | Youn et al. |
| 6,547,453 B1 | 4/2003 | Stummer et al. |
| 6,549,547 B2 | 4/2003 | Galvanauskas et al. |
| 6,552,301 B2 | 4/2003 | Herman et al. |
| 6,555,781 B2 | 4/2003 | Ngoi et al. |
| 6,562,698 B2 | 5/2003 | Manor |
| 6,567,431 B2 | 5/2003 | Tabirian et al. |
| 6,570,704 B2 | 5/2003 | Palese |
| 6,574,024 B1 | 6/2003 | Liu |
| 6,576,917 B1 | 6/2003 | Silfvast |
| 6,580,553 B2 | 6/2003 | Kim et al. |
| 6,592,574 B1 | 7/2003 | Shimmick et al. |
| 6,608,951 B1 | 8/2003 | Goldenberg et al. |
| 6,614,565 B1 | 9/2003 | Klug et al. |
| 6,621,040 B1 | 9/2003 | Perry et al. |
| 6,621,045 B1 | 9/2003 | Liu et al. |
| 6,654,161 B2 | 11/2003 | Bass et al. |
| 6,661,568 B2 | 12/2003 | Hollemann et al. |
| 6,661,816 B2 | 12/2003 | Delfyett et al. |
| 6,661,820 B1 | 12/2003 | Camilleri et al. |
| 6,671,298 B1 | 12/2003 | Delfyett et al. |
| 6,681,079 B1 | 1/2004 | Maroney |
| 6,690,686 B2 | 2/2004 | Delfyett et al. |
| 6,696,008 B2 | 2/2004 | Brandinger |
| 6,697,402 B2 | 2/2004 | Crawford |
| 6,697,408 B2 | 2/2004 | Kennedy et al. |
| 6,700,094 B1 | 3/2004 | Kuntze |
| 6,706,036 B2 | 3/2004 | Lai |
| 6,706,998 B2 | 3/2004 | Cutler |
| 6,723,991 B1 | 4/2004 | Sucha et al. |
| 6,728,273 B2 | 4/2004 | Perry |
| 6,728,439 B2 | 4/2004 | Weisberg et al. |
| 6,735,229 B1 | 5/2004 | Delfyett et al. |
| 6,738,408 B2 | 5/2004 | Abedin |
| 6,744,552 B2 | 6/2004 | Scalora et al. |
| 6,744,555 B2 | 6/2004 | Galvanauskas et al. |
| 6,760,356 B2 | 7/2004 | Erbert et al. |
| 6,774,869 B2 | 8/2004 | Biocca et al. |
| 6,782,207 B1 | 8/2004 | Efimov |
| 6,785,303 B1 | 8/2004 | Holzwarth et al. |
| 6,787,733 B2 | 9/2004 | Lubatschowski et al. |
| 6,787,734 B2 | 9/2004 | Liu |
| 6,801,551 B1 | 10/2004 | Delfyett et al. |
| 6,801,557 B2 | 10/2004 | Liu |
| 6,807,375 B2 | 10/2004 | Dogariu |
| 6,815,638 B2 | 11/2004 | Liu |
| 6,819,694 B2 | 11/2004 | Jiang et al. |
| 6,819,702 B2 | 11/2004 | Sverdlov et al. |
| 6,819,837 B2 | 11/2004 | Li et al. |
| 6,822,187 B1 | 11/2004 | Hermann et al. |
| 6,822,251 B1 | 11/2004 | Arenberg et al. |
| 6,829,517 B2 | 12/2004 | Cheng et al. |
| 6,834,134 B2 | 12/2004 | Brennan, III et al. |
| 6,836,703 B2 | 12/2004 | Wang et al. |
| 6,878,900 B2 | 4/2005 | Corkum et al. |
| 6,885,683 B1 | 4/2005 | Fermann et al. |
| 6,887,804 B2 | 5/2005 | Sun et al. |
| 6,897,405 B2 | 5/2005 | Cheng et al. |
| 6,915,040 B2 | 7/2005 | Willner et al. |
| 6,917,631 B2 | 7/2005 | Richardson et al. |
| 6,928,490 B1 | 8/2005 | Bucholz et al. |
| 6,994,703 B2 | 2/2006 | Wang et al. |
| 7,001,373 B2 | 2/2006 | Clapham et al. |
| 7,002,733 B2 | 2/2006 | Dagenais et al. |
| 7,068,408 B2 | 6/2006 | Sakai |
| 7,072,101 B2 | 7/2006 | Kapteyn et al. |
| 7,088,756 B2 | 8/2006 | Fermann et al. |
| 7,095,772 B1 | 8/2006 | Delfyett et al. |
| 7,097,640 B2 | 8/2006 | Wang et al. |
| 7,116,688 B2 | 10/2006 | Sauter et al. |
| 7,143,769 B2 | 12/2006 | Stoltz et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,289,707 B1 | 10/2007 | Chavez-Pirson et al. |
| 7,332,234 B2 | 2/2008 | Levinson et al. |
| 7,349,589 B2 | 3/2008 | Temelkuran et al. |
| 7,367,969 B2 | 5/2008 | Stoltz et al. |
| 7,413,565 B2 | 8/2008 | Wang et al. |
| 7,414,780 B2 | 8/2008 | Fermann et al. |
| 7,444,049 B1 | 10/2008 | Kim et al. |
| 7,505,196 B2 | 3/2009 | Nati et al. |
| 7,518,788 B2 | 4/2009 | Fermann et al. |
| 7,674,719 B2 | 3/2010 | Li et al. |
| 7,675,674 B2 | 3/2010 | Bullington et al. |
| 7,728,967 B2 | 6/2010 | Ochiai et al. |
| 7,751,118 B1 | 7/2010 | Di Teodoro et al. |
| 7,759,607 B2 | 7/2010 | Chism, II |
| 7,773,216 B2 | 8/2010 | Cheng et al. |
| 7,773,294 B2 | 8/2010 | Brunet et al. |
| 7,787,175 B1 | 8/2010 | Brennan, III et al. |
| 7,792,408 B2 | 9/2010 | Varming |
| 7,822,347 B1 | 10/2010 | Brennan, III et al. |
| 7,847,213 B1 | 12/2010 | Anikitchev |
| 7,943,533 B2 | 5/2011 | Mizuno |
| 7,963,958 B2 | 6/2011 | Stoltz et al. |
| 7,998,404 B2 | 8/2011 | Huang et al. |
| RE43,605 E | 8/2012 | O'Brien et al. |
| 8,338,746 B2 | 12/2012 | Sun et al. |
| 8,373,090 B2 | 2/2013 | Gale et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0097468 A1 | 7/2002 | Mecherle et al. |
| 2002/0097761 A1 | 7/2002 | Sucha et al. |
| 2002/0115273 A1 | 8/2002 | Chandra et al. |
| 2002/0118934 A1 | 8/2002 | Danziger et al. |
| 2002/0153500 A1 | 10/2002 | Fordahl et al. |
| 2002/0162973 A1 | 11/2002 | Cordingley et al. |
| 2002/0167581 A1 | 11/2002 | Cordingley et al. |
| 2002/0167974 A1 | 11/2002 | Kennedy et al. |

(56) References Cited

U.S. PATENT DOCUMENTS

| | | |
|---|---|---|
| 2002/0191901 A1 | 12/2002 | Jensen |
| 2003/0007526 A1* | 1/2003 | Pontis et al. ............... 372/38.02 |
| 2003/0011782 A1 | 1/2003 | Tanno |
| 2003/0031410 A1 | 2/2003 | Schnitzer |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0123496 A1 | 7/2003 | Broutin et al. |
| 2003/0142705 A1 | 7/2003 | Hackel et al. |
| 2003/0152115 A1 | 8/2003 | Jiang et al. |
| 2003/0156605 A1 | 8/2003 | Richardson et al. |
| 2003/0161365 A1 | 8/2003 | Perry et al. |
| 2003/0178396 A1 | 9/2003 | Naumov et al. |
| 2003/0189959 A1* | 10/2003 | Erbert et al. ................. 372/25 |
| 2003/0205561 A1 | 11/2003 | Iso |
| 2003/0223689 A1 | 12/2003 | Koch et al. |
| 2003/0235381 A1 | 12/2003 | Hunt |
| 2004/0000942 A1 | 1/2004 | Kapteyn et al. |
| 2004/0022695 A1 | 2/2004 | Simon et al. |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226922 A1 | 11/2004 | Flanagan |
| 2004/0226925 A1 | 11/2004 | Gu et al. |
| 2004/0233944 A1 | 11/2004 | Dantus et al. |
| 2004/0263950 A1 | 12/2004 | Fermann et al. |
| 2005/0021243 A1* | 1/2005 | Dantus et al. ................. 702/28 |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226278 A1 | 10/2005 | Gu et al. |
| 2005/0226286 A1 | 10/2005 | Liu et al. |
| 2005/0226287 A1 | 10/2005 | Shah et al. |
| 2005/0253482 A1 | 11/2005 | Kapps et al. |
| 2005/0265407 A1 | 12/2005 | Braun et al. |
| 2005/0271094 A1 | 12/2005 | Miller et al. |
| 2005/0274702 A1 | 12/2005 | Deshi |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0091125 A1 | 5/2006 | Li et al. |
| 2006/0093265 A1 | 5/2006 | Jia et al. |
| 2006/0120418 A1* | 6/2006 | Harter et al. ................. 372/30 |
| 2006/0126679 A1 | 6/2006 | Brennan, III et al. |
| 2006/0131288 A1 | 6/2006 | Sun et al. |
| 2006/0159137 A1* | 7/2006 | Shah ............................. 372/25 |
| 2006/0187974 A1 | 8/2006 | Dantus |
| 2006/0201983 A1 | 9/2006 | Kusama et al. |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0237397 A1 | 10/2006 | Yamasaki et al. |
| 2006/0249816 A1 | 11/2006 | Li et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan, III et al. |
| 2007/0098025 A1 | 5/2007 | Hong et al. |
| 2007/0106416 A1 | 5/2007 | Griffiths et al. |
| 2007/0121686 A1 | 5/2007 | Vaissie et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |
| 2008/0029152 A1 | 2/2008 | Milshtein et al. |
| 2008/0050078 A1 | 2/2008 | Digonnet et al. |
| 2008/0058781 A1 | 3/2008 | Langeweyde et al. |
| 2008/0232407 A1 | 9/2008 | Harter et al. |
| 2008/0240184 A1 | 10/2008 | Cho et al. |
| 2008/0264910 A1 | 10/2008 | Kashyap et al. |
| 2009/0020511 A1 | 1/2009 | Kommera et al. |
| 2009/0219610 A1 | 9/2009 | Mourou et al. |
| 2009/0244695 A1 | 10/2009 | Marcinkevicius et al. |
| 2009/0245302 A1 | 10/2009 | Baird et al. |
| 2009/0257464 A1 | 10/2009 | Dantus et al. |
| 2009/0273828 A1 | 11/2009 | Waarts et al. |
| 2009/0290151 A1 | 11/2009 | Agrawal et al. |
| 2009/0297155 A1 | 12/2009 | Weiner et al. |
| 2010/0013036 A1 | 1/2010 | Carey |
| 2010/0032416 A1 | 2/2010 | Jeong et al. |
| 2010/0040095 A1 | 2/2010 | Mielke et al. |
| 2010/0089882 A1 | 4/2010 | Tamura |
| 2010/0118899 A1 | 5/2010 | Peng et al. |
| 2010/0142034 A1 | 6/2010 | Wise et al. |
| 2010/0157418 A1 | 6/2010 | Dong et al. |
| 2010/0181284 A1 | 7/2010 | Lee et al. |
| 2010/0276405 A1 | 11/2010 | Cho et al. |
| 2011/0069723 A1 | 3/2011 | Dong et al. |
| 2014/0044139 A1 | 2/2014 | Dong et al. |
| 2014/0140361 A1 | 5/2014 | Jiang |

FOREIGN PATENT DOCUMENTS

| | | |
|---|---|---|
| EP | 1462831 | 9/2004 |
| JP | 8171103 | 7/1996 |
| JP | 11189472 | 7/1999 |
| JP | 2003181661 | 7/2003 |
| JP | 2003344883 | 12/2003 |
| JP | 2005174993 | 6/2005 |
| WO | WO9428972 | 12/1994 |
| WO | WO2004105100 | 12/2004 |
| WO | WO2004114473 | 12/2004 |
| WO | WO2005018060 | 2/2005 |
| WO | WO2005018061 | 2/2005 |
| WO | WO2005018062 | 2/2005 |
| WO | WO2005018063 | 2/2005 |
| WO | WO2007034317 | 3/2007 |

OTHER PUBLICATIONS

Stevenson et al., Femtosecond Optical Transfection of Cells: Viability and Efficiency, Optics Express, vol. 14, No. 16, pp. 7125-7133, Aug. 7, 2006.

Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985).

Temelkuran, B. et al., "Wavelength-scalable Hollow Optical Fibres with Large Photonic Bandgaps for CO2 Laser Transmission," Nature, Dec. 12, 2002, pp. 650-653.

(56) References Cited

OTHER PUBLICATIONS

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Tirlapur et al., "Targeted Transfection by Femtosecond Laser," Nature Publishing Group, vol. 418, pp. 290-291, Jul. 18, 2002.
Tsai et al., "Ultrashort Pulsed Laser Light," Optics & Photonics News, pp. 25-29, Jul. 2004.
Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.
Weiner, A.M. et al., "Synthesis of Phase-coherent, Picosecond Optical Square Pulses," Optics Letters, vol. 11, No. 3, pp. 153-155, Mar. 1986.
Weiner, A.M., "Femtosecond Optical Pulse Shaping and Processing," Prog. Quant. Electr. 1995, vol. 19, pp. 161-237, 1995.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55 μm Wavelength Region., 2005, Proceedings of SPIE vol. 5633, Advanced Materials and Devices for Sensing and Imaging II, pp. 424-429.
Yeh, et al. "Theory of Bragg Fiber", Journal of the Optical Society America, Sep. 1978, pp. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Agostinelli, J. et al., "Optical Pulse Shaping with a Grating Pair," Applied Optics, vol. 18, No. 14, pp. 2500-2504, Jul. 15, 1979.
Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.
Benoit, G. et al., "Dynamic All-optical Tuning of Transverse Resonant Cavity Modes in Photonic Bandgap Fibers, "Optics Letters, vol. 30, No. 13, Jul. 1, 2005, pp. 1620-1622.
Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.
Chen, X. et al., "Highly Birefringent Hollow-core Photonic Bandgap Fiber," Optics Express, vol. 12, No. 16, Aug. 9, 2004, pp. 3888-3893.
Chen, Y. et al., "Dispersion-Managed Mode Locking", Journal of the Optical Society of America B, Nov. 1999, pp. 1999-2004, vol. 16, No. 11, Optical Society of America.
Dasgupta, S. et al., "Design of Dispersion-Compensating Bragg Fiber with an Ultrahigh Figure of Merit," Optics Letters, Aug. 1, 2005, vol. 30, No. 15, Optical Society of America.
De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.
De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.
Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.
Eggleton, et al., "Electrically Tunable Power Efficient Dispersion Compensating Fiber Bragg Grating," IEEE Photonics Technology Letters, vol. 11, No. 7, pp. 854-856, Jul. 1999.
Engeness et al., "Dispersion Tailoring and Compensation by Modal Interations in Omniguide Fibers," Optics Express, May 19, 2003, pp. 1175-1196, vol. 11, No. 10.
Fink et al., "Guiding Optical Light in Air Using an All-Dielectric Structure," Journal of Lightwave Technology, Nov. 1999, pp. 2039-2041, vol. 17, No. 11.
Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Ibanescu et al., "Analysis of Mode Structure in Hollow Dielctric Waveguide Fibers," Physical Review E 67, 2003, The American Physical Society.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.

(56) References Cited

OTHER PUBLICATIONS

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, Kai-Hsiu et al., "Large-aperture Chirped Volume Bragg Grating Based Fiber CPA System," Optics Express, Apr. 16, 2007, vol. 15, No. 8, pp. 4876-4882.

Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Nishimura et al., "In Vivo Manipulation of Biological Systems with Femtosecond Laser Pulses," Proc. SPIE 6261, 62611J, pp. 1-10, 2006.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. et al. "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Photonics West 2005, San Jose, California, Jan. 2005, pp. 5709-3720.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Ramachandran, S., et al., "High-power Amplification in a 2040-μm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1- 61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

* cited by examiner

AUTOMATED LASER TUNING

CROSS-REFERENCE TO RELATED APPLICATIONS

This application is a continuation-in-part and claims the priority benefit of U.S. patent application Ser. No. 11/740,874 entitled "Intelligent Laser Interlock System" and filed on Apr. 26, 2007 now U.S. Pat. No. 8,232,687, which claims the priority benefit of U.S. Provisional Patent Application Ser. No. 60/796,646 entitled "Laser System Software Development Platform" and filed on Apr. 26, 2006. This application is also a continuation-in-part and claims the priority benefit of U.S. patent application Ser. No. 12/259,176 entitled "Systems and Methods for Control of Ultra Short Pulse Amplification" and filed on Oct. 27, 2008 now U.S. Pat. No. 8,139,910, which is a divisional of U.S. patent application Ser. No. 11/615,883 entitled "Pulse Stretcher and Compressor Including a Multi-Pass Bragg Grating" and filed on Dec. 22, 2006 now U.S. Pat. No. 7,444,049, which claims the priority benefit of U.S. Provisional Patent Application Ser. No. 60/761,736 entitled "Method of Dispersion Compensation in a CPA System" and filed on Jan. 23, 2006, U.S. Provisional Patent Application Ser. No. 60/762,284 entitled "USP Laser Fiber Amplifier" and filed on Jan. 25, 2006, U.S. Provisional Patent Application Ser. No. 60/763,002 entitled "Seed Control In Ultra-Short Pulse Laser Systems" and filed on Jan. 26, 2006, U.S. Provisional Patent Application Ser. No. 60/762,791 entitled "Amplifier Control In Ultra-Short Pulse Laser Systems" and filed on Jan. 26, 2006, and U.S. Provisional Patent Application Ser. No. 60/762,790 entitled "Method of Remote Access To An Ultra-Short Pulse Laser System" and filed on Jan. 26, 2006. This application is also related to co-pending U.S. patent application Ser. No. 2009/0216494 entitled "Network Laser System with Remote Diagnostics" and filed on Jan. 30, 2009. Each of the above patent applications and patents are hereby incorporated by reference.

BACKGROUND

1. Field of the Invention

The present invention relates in general to the field of light amplification, and more particularly to the field of automated laser tuning.

2. Description of Related Art

Chirped Pulse Amplification (CPA) is very useful for producing ultra short-duration high-intensity pulses for use in high peak power ultra short pulse laser systems. CPA increases energy of an ultra short laser pulse while avoiding optical amplifier damage and excessive nonlinear distortion. In this technique, a duration of the pulse is first increased by dispersing the ultra short laser pulse temporally as a function of wavelength (a process called "chirping") to produce a chirped pulse. The chirped pulse is then amplified and recompressed to significantly shorten its duration. Lengthening the pulse in time reduces the peak power of the pulse and, thus, allows energy to be added to the pulse without incurring excessive nonlinearities or reaching a damage threshold of the pulse amplifier and optical components. An amount of pulse amplification that can be achieved is typically proportional to the amount of pulse stretching and compression. Typically, the greater the amount of stretching and compression, the greater the possible pulse amplification.

A CPA system typically comprises an optical stretcher, an optical amplifier, and an optical compressor. The optical stretcher and optical compressor are ideally configured to have equal but opposite dispersive properties to perfectly compensate for one another to minimize the pulse width of an amplified optical pulse. The optical stretcher may comprise a bulk diffraction grating, an optical fiber, a fiber grating, or other dispersive optical elements. Optical fiber-based dispersive optical elements are generally not used in the optical compressor because the peak power of an optical pulse within the optical compressor is generally larger than an optical fiber's nonlinear threshold. Therefore, bulk diffraction gratings are generally used in optical compressors due to the ability of bulk diffraction gratings to handle larger optical power levels than optical fibers.

Any material through which an optical pulse propagates, such as a waveguide in an optical amplifier, may add dispersion to the optical pulse. This additional dispersion may not be compensated by a perfectly matched optical stretcher and compressor pair. In addition, dispersion properties of the components of an ultra short pulse amplification system may be sensitive to temperature as well as minute variations in the parameters and physical configuration of the system components. Therefore, adjustment of various parameters and positions of the system components may be required on a regular and periodic basis to maintain desired system operation. Traditionally, this has made hands-on operation and adjustment by knowledgeable and experienced laser system experts required to properly use ultra short pulse amplification systems.

SUMMARY

In exemplary embodiments, an ultra short pulse system comprises a laser platform which includes an optical source configured to generate an optical pulse, an optical amplifier configured to amplify the optical pulse, and a compressor configured to temporally compress the amplified optical pulse. The ultra short pulse system further comprises monitor circuitry configured to monitor one or more performance aspects of the laser platform. Additionally, the ultra short pulse system may comprise logic configured to control the one or more performance aspects of the laser platform in response to at least the monitored one or more performance aspects.

DETAILED DESCRIPTION

In various embodiments of the present invention, logic may be integrated with an ultra short pulse system to provide automated control and tuning of the ultra short pulse system. The logic may include digital devices such as processors, integrated circuits, firmware, memory, and software programs configured to control the ultra short pulse system. Monitor circuitry may be configured to monitor performance aspects of the ultra short pulse system and provide monitor data to the logic. The logic may implement various control system processes to automatically control and tune the ultra short pulse system so that manual control and tuning may not be necessary. In this way, the ultra short pulse system may operate independently according to pre-programmed parameters without manual intervention, and may do so more efficiently than if manual tuning or control were required. Automated tuning and control of the ultra short pulse system may facilitate applications which would not be practical otherwise.

Figure 1:
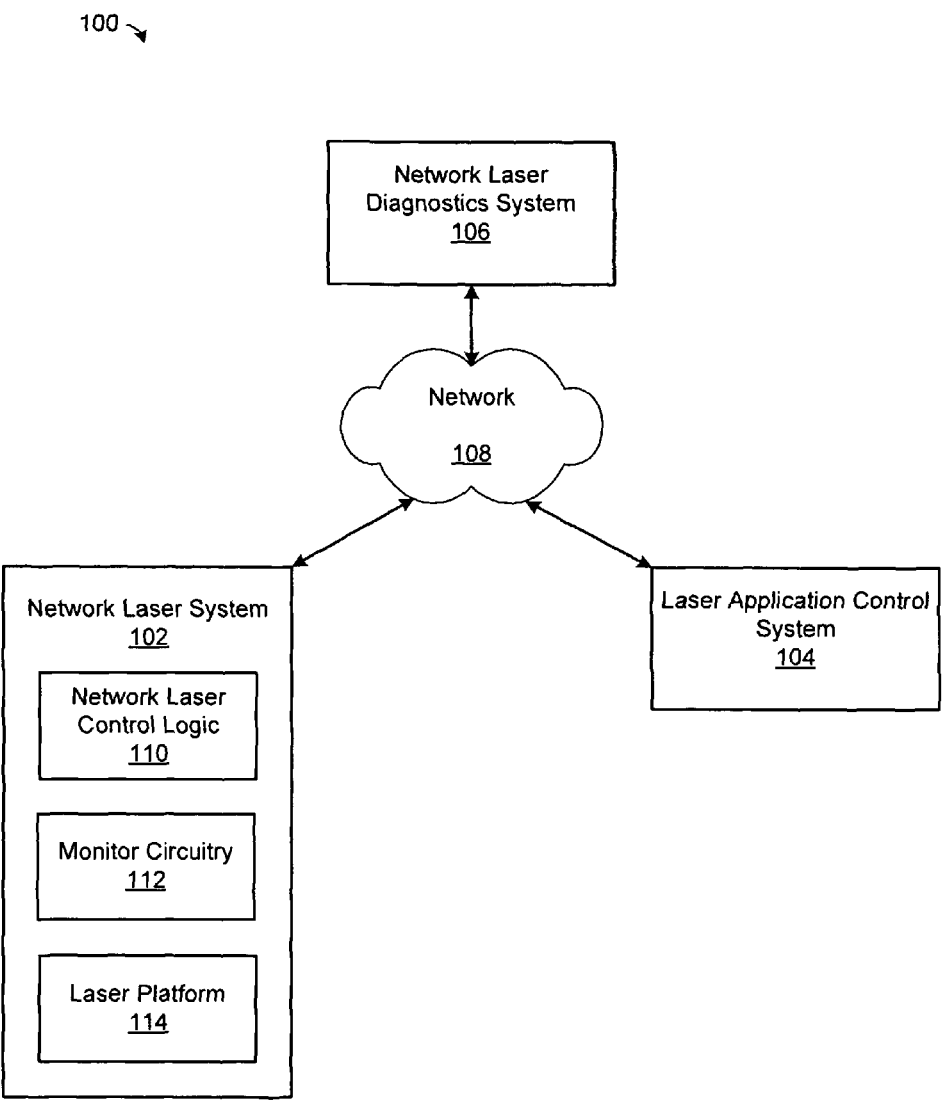
FIG. 1 illustrates an exemplary network laser system environment.

FIG. 1 illustrates an exemplary network laser system environment 100. The network laser system environment 100 comprises a network laser system 102, a laser application control system 104, and a network laser diagnostics system 106, all of which are coupled by a network 108. Any of these systems may comprise a computing device. The network laser system 102 comprises a network laser control logic 110 configured to control one or more performance aspects of the network laser system 102. The network laser control logic 110 may also be configured to provide an interface to the network 108 such that the network laser system 102 may behave as a network device conforming to relevant network communication standards. The network laser control logic 110 may use control system processes involving feedback and control loops to control-system control a laser platform 114. For example, a proportional, integral, derivative (PID) control algorithm may be used. Examples of the laser platform 114 include a chirped pulse amplification system and an ultra short pulse laser system.

The network laser system 102 may also include monitor circuitry 112. The monitor circuitry 112 may be configured to monitor performance aspects of the laser platform 114 and provide performance data to the network laser control logic 110. The monitor circuitry 112 may include sensors such as temperature sensors, current sensors, voltage sensors, optical power sensors, optical energy sensors, pulse repetition rate sensors, pulse duration sensors, position sensors, accelerometers, etc. The monitor circuitry 112 may be coupled with various constituent components of the laser platform 114. The monitor circuitry 112 may also monitor performance aspects of the network laser control logic 110.

The network laser control logic 110 may also be configured to communicate data over the network 108. For example, the network laser control logic 110 may be configured to transmit performance measurement data to the laser application control system 104 and/or the network laser diagnostics system 106. As another example, the network laser control logic 110 may be configured to receive data such as commands or software updates from the laser application control system 104 and/or the network laser diagnostics system 106.

The laser application control system 104 may include a processor configured to execute instructions stored on a memory to perform a method for using the network laser system 102 in an application. The laser application control system 104 may comprise a remote command station for user command and control of the network laser system 102. In some embodiments, the laser application control system 104 may communicatively couple with the network laser system 102 via a wired connection using a communications protocol such as RS-232, USB (Universal Serial Bus), GPIO (General Purpose Input/Output), GPIB (General Purpose Interface Bus)/IEEE-488, or I2C (Inter-Integrated Circuit). In other embodiments, the laser application control system 104 may communicatively couple with the network laser system 102 via the network 108 using a networking protocol such as TCP (Transmission Control Protocol), IP (Internet Protocol), and/or Ethernet over a wired (e.g., 10BASE-T or 100Base-T) or wireless (e.g., Wi-Fi, WiMax, or Bluetooth) connection. Alternatively, the laser application control system 104 may communicatively couple with the network laser system 102 via a telephonic connection. The laser application control system 104 may also include user interface and I/O components such as a video display screen, keyboard, mouse, joystick, touchpad, touch screen, tablet, printer, disk drive, CD-ROM drive, DVD-ROM drive, etc. The laser application control system 104 may be configured to interface with a user and/or various digital devices to perform high-level control functions for the network laser system 102.

In some embodiments, the laser application control system 104 may comprise a general purpose computing system based on a commercially available operating system such as LINUX or WINDOWS. In other embodiments, the laser application control system 104 may comprise a dedicated computing system, such as a single board computer, optionally based on a real-time operating system. In these other embodiments, the dedicated computing system may include hardware-oriented user interface components such as knobs, push-buttons, switches, display lamps, etc. In other embodiments, the laser application control system 104 may comprise a machine control platform (e.g., Numerical Control or G-Code). In still other embodiments, the laser application control system 104 may comprise a portable computing device such as a personal digital assistant (PDA).

The laser application control system 104 may be configured to monitor and control the network laser system 102 over the network 108 such that a user of the network laser system 102 may be physically remote from the network laser system 102. For example, the laser application control system 104 may control laser system variables such as pulse repetition rate, pulse intensity, pulse energy, pulse duration, programmed pulse packet patterns, material-specific ablation rate, and/or system component temperature. The laser application control system 104 may also receive information from the network laser system 102 (e.g., data from the monitor circuitry 112) in real time. The information may be used as feedback in one or more control loops configured to control performance parameters or variables of the laser platform 114. In some embodiments, the network laser system 102 may include a video camera and provide images to the laser application control system 104. The video camera may be configured to capture images in a visible spectrum, ultra violet spectrum, and/or infrared spectrum.

The laser application control system 104 and/or the network laser diagnostics system 106 may be configured to update software or firmware of the network laser system 102 and/or the network laser control logic 110 remotely over the network 108. For example, such software and firmware updates may be used to improve system performance, provide for system diagnostics, and/or add new application functionality.

In exemplary embodiments, the laser application control system 104 may be configured to control more than one network laser system 102. For example, the laser application control system 104 may control a plurality of network laser systems 102 in a coordinated manner for an application that requires more than one network laser system 102. Alternatively, multiple laser application control systems 104 may be configured to communicate and coordinate with one another over the network 108, each of which may control one or more network laser systems 102.

In exemplary embodiments, the network laser diagnostics system 106 may communicate with one or more distributed network laser systems 102 and provide a centralized diagnostics, reporting, or performance monitoring functionality. The network laser diagnostics system 106 may diagnose deviations in laser system performance from reference specifications. The network laser diagnostics system 106 may also be configured to conduct performance evaluations and tests of components and subsystems included in the network laser system 102. In one example, a service technician may use the network laser diagnostics system 106 to monitor, diagnose, adjust, and tune the network laser system 102 remotely over the network 108 without physically seeing or touching the network laser system 102. The service technician may also determine what repairs or parts replacements are needed for the network laser system 102 prior to traveling to a location of the network laser system 102 to make the necessary parts repairs or replacements. The network laser diagnostics system 106 may also perform corrective maintenance of the network laser system 102 remotely over the network 108.

In some embodiments, the functions of the network laser diagnostics system 106 may be performed by the laser application control system 104, and vice versa. Additionally, there may be more than one of any of the network laser system 102, laser application control system 104, and the network laser diagnostics system 106. The network laser diagnostics system 106 may communicate with more than one network laser system 102 and/or laser application control system 104. Likewise, the laser application control system 104 may communicate with more than one network laser system 102 and/or network laser diagnostics system 106. Furthermore, the network laser system 102 may communicate with more than one laser application control system 104 and/or network laser diagnostics system 106.

Figure 2:
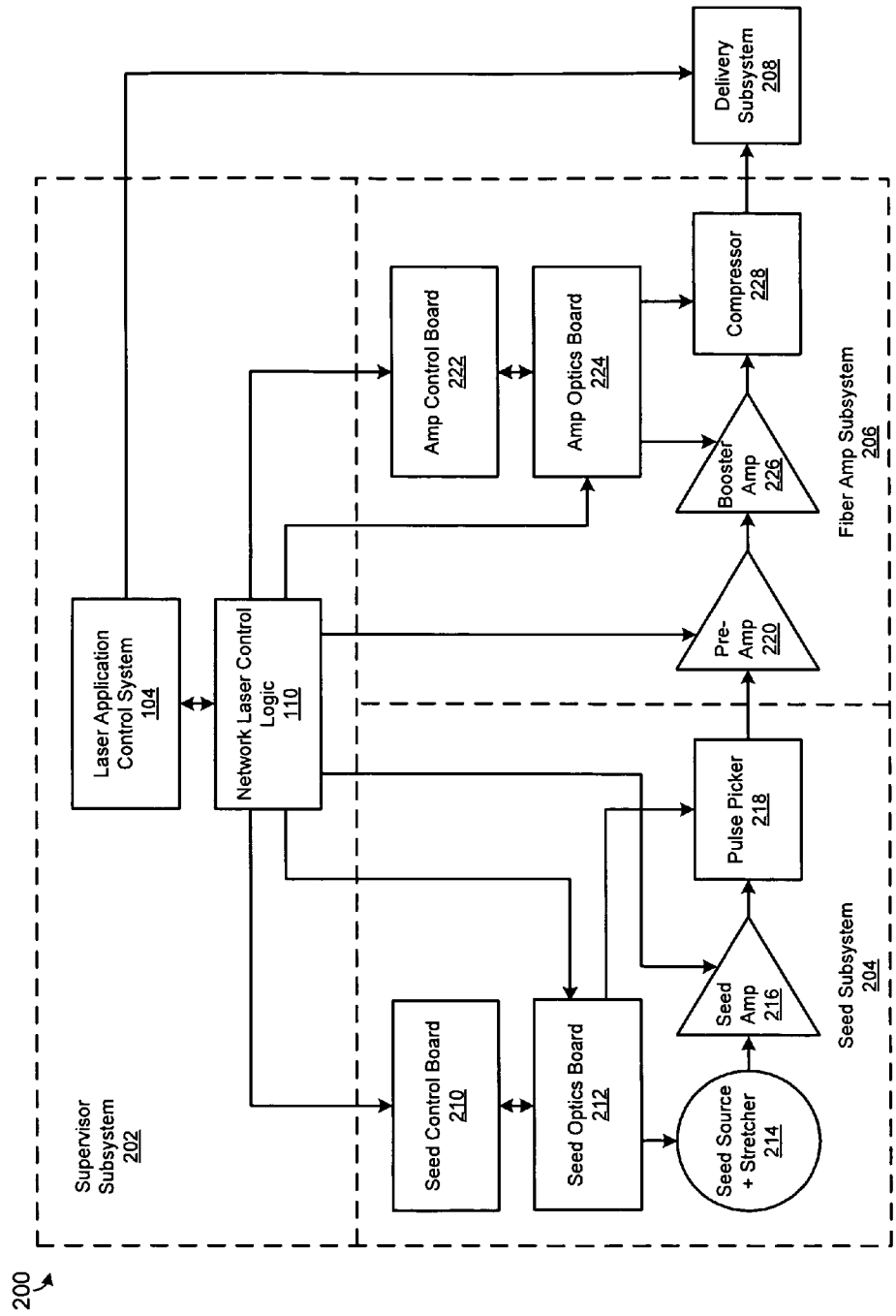
FIG. 2 illustrates an exemplary control-system controlled ultra short pulse system.

FIG. 2 illustrates an exemplary control-system controlled ultra short pulse (USP) laser system 200. The USP laser system 200 may comprise a turn-key system configured such that hardware and software controls, sensors, and feedback loops provide hierarchical layers of software and hardware control loops to facilitate automated tuning and operation. The USP laser system 200 may also be configured for development of laser-based applications using the USP laser system 200 by a non-specialist in laser technology.

In exemplary embodiments, the USP laser system 200 is logically divided into four subsystems: a supervisor subsystem 202, a seed subsystem 204, a fiber amplifier subsystem 206, and a delivery subsystem 208. The USP laser system 200 may comprise an embodiment of the network laser system environment 100. In one embodiment, the network laser system 102 may include the seed subsystem 204, the fiber amplifier subsystem 206, the delivery subsystem 208, and at least a portion of the supervisor subsystem 202. In various embodiments, any of the optical amplifiers represented in the USP laser system 200 may include more than one optical amplifier.

The exemplary supervisor subsystem 202 may comprise the laser application control system 104 and the network laser control logic 110. In some embodiments, the network laser diagnostics system 106 (not shown) may be included in or coupled with the supervisor subsystem 202. The laser application control system 104 may communicatively couple with the network laser control logic 110 using wired or wireless point-to-point or network communications. Likewise, the laser application control system 104 may communicatively couple with the delivery subsystem 208 using wired or wireless point-to-point or network communications. The network laser control logic 110 may communicatively couple with components of the seed subsystem 204 and the fiber amplifier subsystem 206 to control and/or monitor performance aspects of the network laser system 102. The monitor circuitry 112 may be included in any of the supervisor subsystem 202, seed subsystem 204, fiber amplifier subsystem 206, and delivery subsystem 208.

The supervisor subsystem 202 may be configured to provide autonomous control of the laser platform 114. This autonomous control may include monitoring and controlling power supplies, laser beam quality, and temperature of one or more components of the laser platform 114. The supervisor subsystem 202 may also provide local control and/or monitoring of the laser platform 114 using a front panel and/or GPIO pins. The supervisor subsystem 202 may also be configured to collect, store, and/or analyze monitored diagnostic and operational data pertaining to the laser platform 114.

In exemplary embodiments, the seed subsystem 204 may be configured to generate a seed laser pulse and feed the seed laser pulse to the fiber amplifier subsystem 206. The seed subsystem 204 may comprise a seed control board 210, a seed optics board 212, a seed source and stretcher 214, a seed amplifier 216, and a pulse picker 218. The seed source and stretcher 214 may include a mode-locked laser, a Bragg fiber stretcher, a high dispersion fiber coil, and/or a chirped fiber Bragg grating (CFBG). In some embodiments, the network laser control logic 110 may control and/or monitor the seed control board 210, the seed optics board 212, and the seed amplifier 216. Alternatively, the seed control board 210 may control and monitor the seed optics board 212. The seed optics board 212 may control the seed source and stretcher 214 and the pulse picker 218. The seed source and stretcher 214 may be configured to generate a seed pulse and then temporally stretch the seed pulse. The seed amplifier 216 may be configured to optically amplify a power level of the stretched seed pulse. Subsequently, the pulse picker 218 may be configured to selectively block or pass one or more of the amplified stretched seed pulses to the fiber amplifier subsystem 206. In exemplary embodiments, the seed subsystem 204 may be configured to provide a dispersion tuning loop.

The fiber amplifier subsystem 206 may be configured to amplify a power level of the one or more picked seed pulses received from the seed subsystem 204. In exemplary embodiments, the fiber amplifier subsystem 206 comprises a pre-amplifier 220 and a booster amplifier 226 configured to optically amplify a power level of the one or more picked seed pulses and provide the one or more amplified pulses to a compressor 228. In one embodiment, the booster amplifier 226 may comprise an erbium-doped fiber amplifier (EDFA) and/or a ytterbium-doped fiber amplifier (YDFA). The compressor 228 may be configured to temporally compress the one or more amplified pulses, and provide the one or more compressed pulses to the delivery subsystem 208. In one embodiment, the compressor 228 may comprise a Treacy compressor. An amplifier control board 222 may be configured to control and monitor an amplifier optics board 224. The exemplary amplifier optics board 224 may be configured to control the booster amplifier 226 and the compressor 228. In exemplary embodiments, the network laser control logic 110 may be configured to control the amplifier control board 222, the amplifier optics board 224, and the pre-amplifier 220.

The exemplary delivery subsystem 208 may comprise mechanical and/or optical components configured to deliver a laser beam to an intended destination, such as a work surface. For example, the delivery subsystem 208 may include an x-y positioning table, x-y-z positioning table, and/or robotic arm configured to position an ablation beam to strike a target.

The USP laser system 200 may control a wide variety of component performance characteristics, including a pulse energy or peak and/or average power output of any of the compressor 228, the booster amplifier 226, the pre-amplifier 220, the seed amplifier 216, and the seed source and stretcher 214. The USP laser system 200 may also control a pulse repetition rate output from the delivery subsystem 208, the compressor 228, the pulse picker 218, and/or the seed source and stretcher 214. In some embodiments, an embodiment of the pulse picker 218 that includes an electro-optical modulator (EOM) may be controlled to set a specified output power level at a given seed amplifier 216 pump current by setting a bias current of the electro-optical modulator. In some embodiments, an embodiment of the pulse picker 218 that includes an acousto-optical modulator (AOM) may be controlled to set a specified output power level at a given seed amplifier 216 pump current by setting a diffraction efficiency of the acousto-optical modulator. Pulse repetition rate from the seed source and stretcher 214 and/or the pulse picker 218 may be set to control an output optical power from the compressor 228.

Step-wise control of an ablation rate may be achieved by configuring multiple amplifiers in parallel in a train mode, where each amplifier provides a pulse at a slight offset from a neighboring amplifier to generate a train of output pulses in response to a single input pulse. By turning amplifiers on and off, delivered energy may be controlled in a step-wise fashion, resulting in step-wise control of the ablation rate.

In some embodiments, a polarization selective device (e.g., a half-wave plate) may be included in the compressor 228 and positioned to set or reduce optical power losses in the compressor 228. A control loop may be configured to periodically hold pump diode current constant in an EDFA along an optical propagation path between the pulse picker 218 and the compressor 228, while automatically adjusting a position of the polarization selective device to minimize optical power losses in the compressor 228. The adjustment may be based on comparing sensor feedback from an input to the compressor 228 with sensor feedback from an output from the compressor 228. The adjustment may be performed by scanning a position of the polarization selective device through a range of positions, logging net power loss through the compressor 228 verses a position of the polarization selective device, and selecting a minimum-loss position of the polarization selective device.

A power output from the seed source and stretcher 214 may be controlled by setting current values of pump diodes which pump an optional EDFA in the seed source based on feedback from at least a monitor (e.g., sensor) of an output of the seed source and stretcher 214. A power output from the optional seed amplifier 216 may be controlled by setting current values of pump diodes which pump the optional EDFA in the seed source based on feedback from at least a monitor of the output of the pulse picker 218. Likewise, the output power level of the pulse picker 218 may be controlled based on feedback from at least a monitor of an output of the pulse picker 218. In addition, an output power level of the pre-amplifier 220, booster amplifier 226, or compressor 228 may be controlled based on feedback from at least a monitor of the output of the compressor 228. The output power level may be controlled by setting current values of pump diodes which pump an optional EDFA included along the optical propagation path between the pulse picker 218 and the compressor 228.

The USP laser system 200 may include tap points at various electrical nodes and/or at various points along optical propagation paths. The tap points may include sensors and/or monitors configured to provide feedback to one or more control systems regarding operation of the USP laser system 200. For example, tap points may be provided after the seed source and/or before the stretcher of the seed source and stretcher 214, before or after any power amplifier along the optical propagation path, before or after the pulse picker 218, or before, within, or after the compressor 228. The tap points may include voltage monitors, current monitors, temperature monitors, optical power monitors, frequency monitors, pulse repetition rate monitors, safety shutter position monitors, and various signal quality monitors. Control points may include current controls, polarization control filter set points, power amplifier power controls, amplifier safety controls, temperature controls (e.g., heaters, chillers, thermostats), digital clocks, safety shutter controls, and RF drive controls (e.g., gain and bias).

Any of the control laser application control system 104, the network laser control logic 110, the seed control board 210, and the amplifier control board 222 may include logic configured to perform control system functions for at least a portion of the USP laser system 200. The logic may include a processor, application specific integrated circuit (ASIC), field programmable gate array (FPGA), memory, firmware, and/or software instructions stored on a storage medium. Analog to digital converters may be included in, or coupled with, any component of the USP laser system 200 to facilitate control and/or monitoring in conjunction with the supervisor subsystem 202. Analog to digital conversion at a sensor's location may improve accuracy compared to performing the conversion at a control board because digital transmission lines are more immune to noise than analog transmission lines.

In some embodiments, the USP laser system 200 may be controlled by periodically holding current to pump diodes which pump an EDFA in the seed amplifier 216 constant while adjusting an EOM bias current of the pulse picker 218 to minimize output power of the pulse picker 218 based on feedback from at least a monitor of the output of the pulse picker 218. In other embodiments, the output power of the pulse picker 218 may be set to a desired value (e.g., minimized) by scanning the EOM bias current through a range and logging the output power of the pulse picker 218 versus pulse picker EOM bias current based on feedback from at least a monitor of the output of the pulse picker 218, and then selecting a desired bias current to achieve the desired power output value of the pulse picker 218.

In some embodiments, the USP laser system 200 may be controlled by periodically holding current to pump diodes which pump an EDFA in the seed amplifier 216 constant while adjusting an AOM diffraction efficiency of the pulse picker 218 to minimize output power of the pulse picker 218 based on feedback from at least a monitor of the output of the pulse picker 218. In other embodiments, the output power of the pulse picker 218 may be set to a desired value (e.g., minimized) by scanning the AOM diffraction efficiency through a range and logging the output power of the pulse picker 218 versus pulse picker AOM diffraction efficiency based on feedback from at least a monitor of the output of the pulse picker 218, and then selecting a desired diffraction efficiency to achieve the desired power output value of the pulse picker 218. Diffraction efficiency tuning may be accomplished by changing the power of a radio frequency (RF) signal applied to the AOM electro-acoustic transducer.

In an exemplary embodiment, the seed subsystem 204 is configured to synchronize the pulse picker 218 with an output of the seed source and stretcher 214. Logic may monitor a pulse synchronization output from the seed source, synchronize the pulse synchronization output with a local oscillator (e.g., 100 MHz), and then create a divided and phased signal for timing control of the pulse picker 218. The logic may include selectable pulse pick rates, which may be selected by a user or program via the network laser control logic 110 or the laser application control system 104. The logic may also include a selectable phasing count to align the pulse picker 218 to optical pulses input to the pulse picker 218. In an embodiment having a 100 MHz oscillator, the logic may include 10 ns phasing increments. Because the oscillator is asynchronous with the timing of the optical pulses input to the pulse picker 218, there may therefore be an uncertainty on the timing of the pulse picker 218 relative to the optical pulses. The uncertainty may be equal to the phasing increments.

In various embodiments, control loops are stabilized by monitoring multiple tap points within the USP laser system 200. Seed frequency and pulse repetition rates may be monitored to maintain system performance within specified tolerances (e.g., 20 MHz+/−0.5% pulse repetition rate). System failure may be indicated when system performance cannot be maintained within the specified tolerances.

In one embodiment, an amplifier control loop may control the output power of the seed amplifier 216 to achieve a specified power level by adjusting a laser diode current setpoint of the seed amplifier 216. The laser diode current setpoint may be adjusted based on feedback from a tap point monitoring the power level output from the seed amplifier 216. The seed amplifier 216 may operate in a constant-output-power mode while the amplifier control loop functions.

In some embodiments, nested control loops may be coordinated with one another to prevent interference with one another. For example, the pulse picker control loop may be coordinated with the amplifier control loop such that the pulse picker control loop disables the amplifier control loop temporarily while the pulse picker control loop executes a "minimum hunting" algorithm.

In one embodiment, a "maximum hunting" algorithm may be employed. In one example, a range of current levels for the seed source control may be scanned, and a value that results in the highest average power at a tap point following the seed source and stretcher 214 may be recorded and set as the operating current for the seed source. The scan algorithm may be triggered by manual input, program control, a timer, or a number of monitored tap points whose values satisfy a threshold condition. Likewise, a "minimum hunting" algorithm may be employed in a pulse picker control loop to minimize an optical power level output from the pulse picker 218. A benefit of the maximum and minimum hunting algorithms is that calibration is not required.

In an embodiment of the present invention, the USP laser system 200 may have a minimum output pulse energy of 10 µJ/pulse, minimum pulse fluence of 3 J/cm$^2$, maximum pulse width of 5 ps Full Width Half Maximum (FWHM), approximately 80% of the output energy within the ultra short pulse, M-squared parameter of approximately 1.2, spot size of approximately 20 µm to 200 µm, and software-selectable repetition rate of approximately 100 KHz to 5 MHz. In another embodiment of the present invention, the USP laser system 200 may have a minimum output pulse energy of 1 NJ/pulse, minimum pulse fluence of 0.1 J/cm$^2$, maximum pulse width of 1 ps Full Width Half Maximum (FWHM), approximately 90% of the output energy within the ultra short pulse, M-squared parameter of approximately 1.2, spot size of approximately 4 µm to 30 m, and software-selectable repetition rate of approximately 1 Hz to 500 kHz. Optical output from the delivery subsystem 208 may use free space optics. In various embodiments, the maximum pulse width may be less than 25 ps, 10 ps, 3 ps, or 900 fs.

Figure 3:
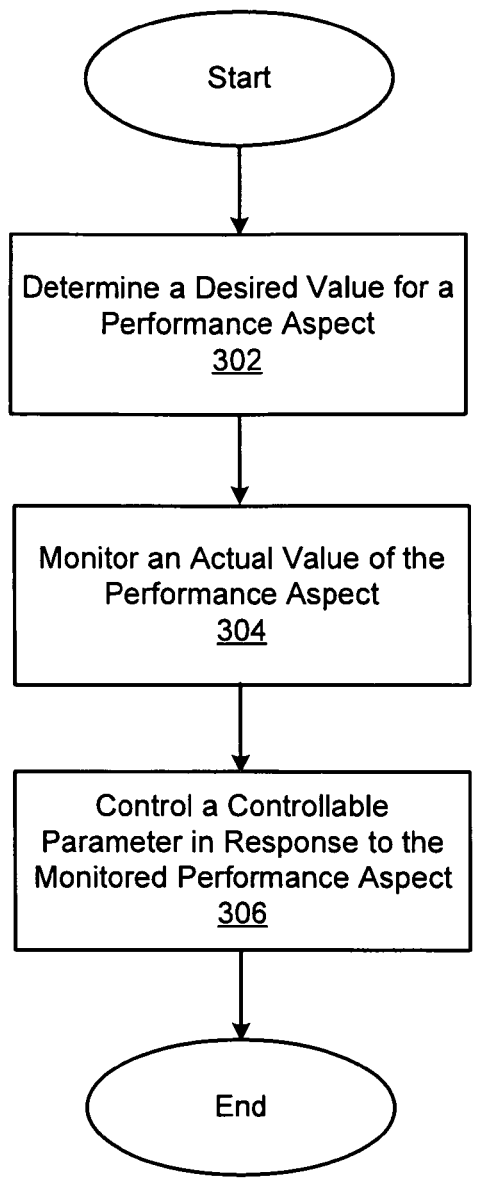
FIG. 3 illustrates an exemplary method of control-system controlling an ultra short pulse system.

FIG. 3 illustrates an exemplary method of control-system controlling an ultra short pulse system. The method includes determining a desired value for a performance aspect of a laser system such as the USP laser system 200 or laser platform 114, monitoring an actual value of the performance aspect, and controlling a controllable parameter in response to the monitored actual value.

In step 302, a desired value for a performance aspect of the laser system is determined. The desired performance aspect may include performance aspects of constituent components of the laser system. These constituent components may include an optical pulse generator and an optical stretcher such as the seed source and stretcher 214, an optical amplifier such as the seed amplifier 216, pre-amplifier 220, and/or the booster amplifier 226, a pulse picker such as the pulse picker 218, and an optical compressor such as the optical compressor 228. The desired performance aspect may include an average power output, a peak power output, an output pulse repetition rate, an output pulse energy, an output noise level, and output signal to noise ratio. Other performance aspects may include a temperature of any of the constituent components, a power output from any of the constituent components, a wavelength of the optical pulse, a pulse repetition rate from a pulse picker, a pulse repetition rate from a seed source, an output pulse shape, an output pulse rise time, an output pulse fall time, and an output pulse width or duration. Additional performance aspects may include a dispersion of the stretcher, a dispersion of the compressor, and polarization.

In step 304, an actual value of the performance aspect identified in step 302 is monitored. The performance aspect may be monitored using one or more sensors coupled with the laser platform 114. The monitored performance aspect may be logged or stored locally at the network laser system 102. In some embodiments, the monitored performance aspect may be transmitted to the laser application control system 104.

In step 306, a controllable parameter of the laser system is controlled in response to the performance aspect monitored in step 304. The controllable parameter may be controlled using a control system process such that future monitored values of the performance aspect in step 304 will be closer to the desired value determined in step 302. For example, the controllable parameter may be controlled such that the output pulse duration is controlled and automatically tuned over a range between approximately 0.5 ps and 20 ps.

As an example, a monitored optical power in step 304 may be desired to be kept at a constant value. If the monitored optical power is measured to be above or below its desired constant value in step 304, a controllable parameter such as laser diode pump current may be controlled to change the measured value of the monitored optical power to be closer to the desired value in step 306. In some embodiments, the monitored optical power may need to be above or below its desired constant value by a specified threshold value before the controllable parameter is controlled to change the measured value of the monitored optical power. The threshold value may typically be larger than a margin of error in the measurement of the monitored optical power or an acceptable operating range of the monitored optical power.

As another example, the laser system may need to be operated using one set of parameter settings to ablate a first material, and a second set of parameter settings to ablate a second material. Spectroscopy may be used to monitor a type of material being ablated by the laser system. The laser system may be controlled using the first set of parameter settings when the spectroscopy results show that the first material is being ablated. If the material being ablated changes to the second material, the laser system may then be controlled using the second set of parameter settings. In various embodiments, this may be useful when ablating through a number of layers of different materials on a single object, such as different tissues in an organism or different layers of a semiconductor substrate.

In some embodiments, a water chiller may be used to control a temperature of a constituent component of the laser system. In other embodiments, metal plates may be heated or cooled. In still other embodiments, thermoelectric cooler elements may be used as temperature controllers. The temperature of particular components of the laser system may have an impact on their performance, such as dispersion or wavelength. For example, the stretcher and/or compressor may be temperature controlled to match their dispersion properties to one another.

Electrical current values in laser diodes may also be controlled to control laser pulse power or optical amplification factors, for example. Some controls may be by electromechanical means, such as using piezoelectric devices and/or transducers to stretch or relax fibers or Bragg gratings, open and close shutters, move motorized polarization control elements or waveplates, etc.

Tunable lasers may also be controlled to tune an output wavelength of the laser system. For example, the output wavelength may be controlled and/or automatically tuned over a range between approximately 1530 nm to 1580 nm, corresponding to an optical gain spectrum of erbium-doped fiber (i.e., the erbium glass optical gain spectrum). As another example, the output wavelength may be controlled and/or automatically tuned over a range between approximately 1030 nm to 1100 nm, corresponding to an optical gain spectrum of ytterbium-doped fiber (i.e., the ytterbium glass optical gain spectrum).

Figure 4:
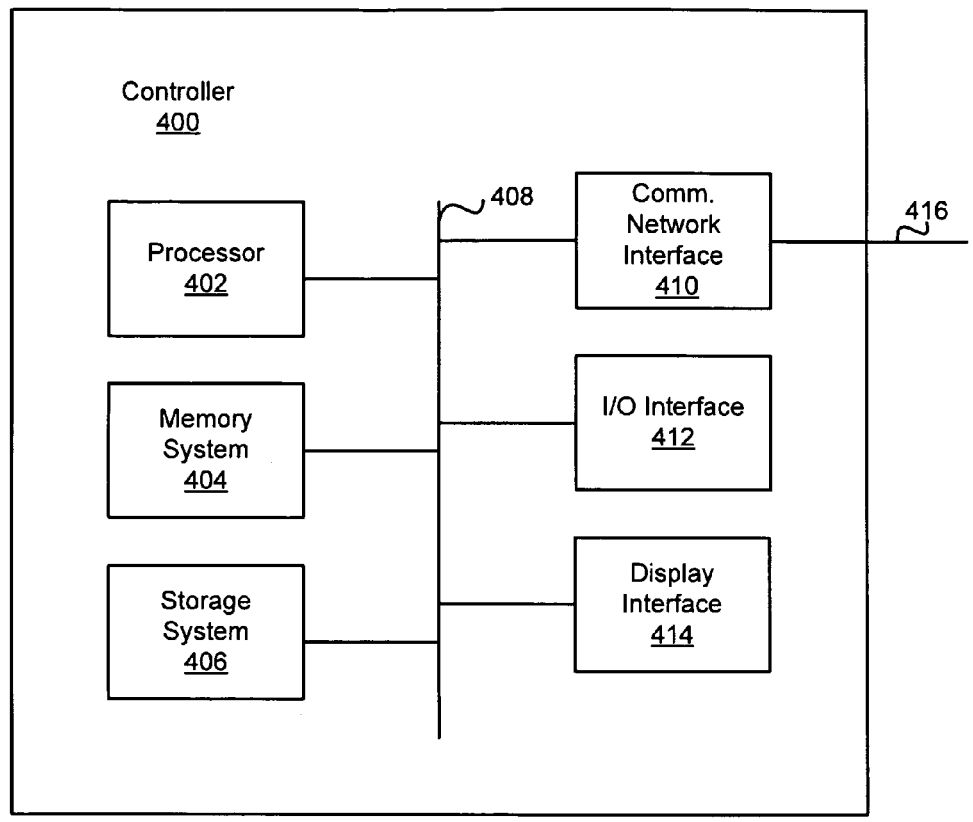
FIG. 4 illustrates an exemplary controller.

FIG. 4 illustrates an exemplary controller 400. The controller 400 may comprise any of the laser application control system 104, network laser control logic 110, seed control board 210, amplifier control board 222, and network laser diagnostics system 106 according to some embodiments. The controller 400 may comprise a processor 402, a memory system 404, and a storage system 406, which are all coupled to a bus 408. The controller 400 may also comprise a communications network interface 410, an input/output (I/O) interface 412, and a display interface 414. The communications network interface 410 may couple with the communication network 108 via a communication medium 416. In some embodiments, the controller 400 may couple to another embodiment of the controller 400, which in turn may couple with the communication network 108. The bus 408 provides communications between the communications network interface 410, the processor 402, the memory system 404, the storage system 406, the I/O interface 412, and the display interface 414.

The communications network interface 410 may communicate with other digital devices (not shown) via the communications medium 416. The processor 402 executes instructions. The memory system 404 permanently or temporarily stores data. Some examples of the memory system 404 are RAM and ROM. The storage system 406 also permanently or temporarily stores data. Some examples of the storage system 406 are hard disks and disk drives. The I/O interface 412 may include any device that can receive input and provide output to a user. The I/O interface 412 may include, but is not limited to, a keyboard, a mouse, a touchscreen, a keypad, a biosensor, a compact disc (CD) drive, a digital versatile disc (DVD) drive, or a floppy disk drive. The display interface 414 may include an interface configured to support a display, monitor, or screen. In some embodiments, the controller 400 comprises a graphical user interface to be displayed to a user over a monitor in order to allow the user to control the controller 400.

The above-described modules may be comprised of instructions that are stored on storage media (e.g., computer readable media). The instructions may be retrieved and executed by a processor (e.g., the processor 402). Some examples of instructions include software, program code, and firmware. Some examples of storage media comprise memory devices, tape, disks, and integrated circuits. The instructions are operational when executed by the processor to direct the processor to operate in accordance with embodiments of the present invention. Those skilled in the art are familiar with instructions, processor(s), and storage media.

In the foregoing specification, the invention is described with reference to specific embodiments thereof, but those skilled in the art will recognize that the invention is not limited thereto. Various features and aspects of the above-described invention can be used individually or jointly. Further, various embodiments of the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A laser system comprising:
    a) a network laser system having:
        i) a controller to control performing actions of a laser platform that generates an optical pulse, wherein the laser platform comprises an optical source that generates a seed optical pulse, an optical amplifier that amplifies the seed optical pulse, a pulse picker that selectively blocks or passes one or more of the amplified stretched seed pulses, and a compressor that temporally compresses the amplified optical pulse;
        ii) monitor circuitry that monitors one or more performance aspects of the laser platform;
        iii) a logic controller that automatically controls the one or more performance aspects of the laser platform in response to at least the monitored one or more performance aspects, wherein the one or more performance aspects include one or more of an average power output, a peak power output, an output pulse repetition rate, an output pulse energy, an output noise level, and an output pulse signal-to-noise ratio, such that an optimized system is maintained; and
    b) a laser application control system including a processor configured to execute instructions to remotely command the network laser system, wherein the laser application control system is configured to receive an actual performing data of the one or more performance aspects from the monitor circuitry in real time to maintain the laser platform performance within a predetermined tolerance.

2. The system of claim 1, wherein the logic further communicates data with at least one remote computing device.

3. The system of claim 1, wherein the logic further controls the one or more performance aspects in response to data received from at the least one remote computing device.

4. The system of claim 3, wherein the logic further controls the monitored one or more performance aspects from exceeding designated ranges regardless of the data received from the at least one remote computing device.

5. The system of claim 1, wherein a pulse width of the optical pulse is less than 25 Ps.

6. The system of claim 1, wherein a pulse width of the optical pulse is less than 10 Ps.

7. The system of claim 1, wherein a pulse width of the optical pulse is less than 3 ps.

8. The system of claim 1, wherein a pulse width of the optical pulse is less than 900 fs.

9. The system of claim 1, wherein the logic further controls and automatically tunes a laser wavelength.

10. The system of 1, wherein the logic further controls and automatically tunes a laser wavelength over a range between 1530 nm and 1580 nm.

11. The system of claim 1, wherein the logic further controls and automatically tunes a laser wavelength over a range between 1030 nm and 1100 nm.

12. The system of claim 1, wherein the logic further controls and automatically tunes a laser pulse duration.

13. The system of claim 1, wherein the logic further controls and automatically tunes a laser pulse duration over a range between 0.5 Ps and 20 Ps.

14. The system of claim 1, wherein the logic further controls and automatically tunes a laser pulse energy.

15. The system of claim 1, wherein the logic further controls and automatically tunes a laser pulse repetition rate.

16. A method comprising:
a) determining a desired value for a performance aspect of an ultra short pulse network laser system that generates an optical pulse, wherein the ultra short pulse network laser system comprises a controller to control performing actions of a laser platform comprising an optical source that generates a seed optical pulse, an optical amplifier that amplifies the seed optical pulse, a pulse picker that selectively blocks or passes one or more of the amplified stretched seed pulses, and a compressor that temporally compresses the amplified optical pulse;
b) monitoring an actual value of the performance aspect of the ultra short pulse network laser system;
c) automatically controlling a controllable parameter of the ultra short pulse network laser system in response to the monitored actual value of the performance aspect, wherein the one or more performance aspects include one or more of an average power output, a peak power output, an output pulse repetition rate, an output pulse energy, an output noise level, and an output pulse signal-to-noise ratio, such that an optimized system is maintained; and
d) remotely commanding the ultra short pulse network laser system using a laser application control system including a processor configured to execute instructions, wherein the laser application control system is configured to receive an actual performing data of the one or more performance from the monitor circuitry in real time to maintain the laser platform performance within a predetermined tolerance.

17. The method of claim 16, wherein the controllable parameter includes a temperature of a temperature controller.

18. The method of claim 16, wherein the performance aspect includes an output pulse duration.

19. The method of claim 16, wherein the performance aspect includes an output wavelength.

20. The method of claim 16, wherein the performance aspect includes an output pulse repetition rate.

21. The method of claim 16, wherein controlling the controllable parameter of the ultra short pulse network laser system is further in response to a monitored actual value of a performance aspect of another ultra short pulse network laser system.

22. The method of claim 16, wherein controlling the controllable parameter of the ultra short pulse network laser system is further in response to a communication received from a remote computing system.

23. A non-transitory computer readable storage medium having stored thereon a program executable by a processor to perform a method comprising:
a) determining a desired value for a performance aspect of a network laser platform that generates an optical pulse, wherein the network laser platform performs actions controlled by a controller in a network laser system comprises an optical source that generates a seed optical pulse, an optical amplifier that amplifies the seed optical pulse, a pulse picker that selectively blocks or passes one or more of the amplified stretched seed pulses, and a compressor that temporally compresses the amplified optical pulse;
b) monitoring an actual value of the performance aspect of the network laser platform, and automatically controlling a controllable parameter of the network laser platform in response to the monitored actual value of the performance aspect, wherein the one or more performance aspects include one or more of an average power output, a peak power output, an output pulse repetition rate, an output pulse energy, an output noise level, and an output pulse signal-to-noise ratio, such that an optimized system is maintained; and
c) remotely commanding the network laser platform using a laser application control system including a processor configured to execute instructions, wherein the laser application control system is configured to receive an actual performing data of the one or more performance aspects from the monitor circuitry in real time to maintain the laser platform performance within a predetermined tolerance.

24. The computer readable storage medium of claim 23, wherein controlling the controllable parameter of the network laser platform is further in response to a monitored actual value of a performance aspect of another laser platform.

25. The computer readable storage medium of claim 23, wherein controlling the controllable parameter of the network laser platform is further in response to a communication received from a remote computing system.

26. The computer readable storage medium of claim 23, wherein the performance aspect includes an average power output and controlling a controllable parameter includes control-system controlling at least one of
a) a power output from a stretcher,
b) a power output from a power amplifier,
c) a power output from a pulse picker,
d) a pulse picker output pulse repetition rate,
e) an output pulse shape,
f) an output pulse width,
g) a temperature of a stretcher,
h) a temperature of a compressor,
i) a dispersion of the stretcher,
j) a dispersion of the compressor,
k) mechanical positioning of components of the compressor, and
l) an output pulse polarization.

27. The computer readable storage medium of claim 23, wherein the performance aspect includes an output pulse repetition rate and controlling a controllable parameter includes control-system controlling at least one of
a) a power output from a stretcher,
b) a power output from a power amplifier,
c) a power output from a pulse picker,
d) a pulse picker output pulse repetition rate,
e) an output pulse shape,
f) an output pulse width,
g) a temperature of a stretcher,
h) a temperature of a compressor,
l) a dispersion of the stretcher, j) a dispersion of the compressor,
k) mechanical positioning of components of the compressor, and
l) an output pulse polarization.

28. The computer readable storage medium of claim 23, wherein the performance aspect includes an output pulse energy and controlling a controllable parameter includes control-system controlling at least one of
a) a power output from a stretcher,
b) a power output from a power amplifier,
c) a power output from a pulse picker,
d) a pulse picker output pulse repetition rate,
e) an output pulse shape,
f) an output pulse width,
g) a temperature of a stretcher,
h) a temperature of a compressor,
i) a dispersion of the stretcher,
j) a dispersion of the compressor,
k) mechanical positioning of components of the compressor, and
l) an output pulse polarization.

29. The computer readable storage medium of claim 23, wherein the performance aspect includes an output pulse signal to noise ratio and controlling a controllable parameter includes control-system controlling at least one of
a) a power output from a stretcher,
b) a power output from a power amplifier,
c) a power output from a pulse picker,
d) a pulse picker output pulse repetition rate,
e) an output pulse shape,
f) an output pulse width,
g) a temperature of a stretcher,
h) a temperature of a compressor,
l) a dispersion of the stretcher,
j) a dispersion of the compressor,
k) mechanical positioning of components of the compressor, and
l) an output pulse polarization.

30. The computer readable storage medium of claim 23, wherein the method further comprises:
remotely accessing a control system of the network laser platform from a remotely located command station;
receiving status information from the network laser platform at the command station; and
transmitting information to the network laser platform, the transmitted information including at least one of:
a) a software update for the control system,
b) data for improving operations of an application of the network laser platform,
c) data for performing maintenance of the network laser platform,
d) data for control of an application of the network laser platform, and
e) data for performing a test of the network laser platform.

31. The system of claim 1 wherein the optimized system is maintained by compensating an amount of dispersion.

32. The system of claim 16 wherein the optimized system is maintained by compensating an amount of dispersion.

33. The system of claim 23 wherein the optimized system is maintained by compensating an amount of dispersion.

* * * * *